Figure 1:
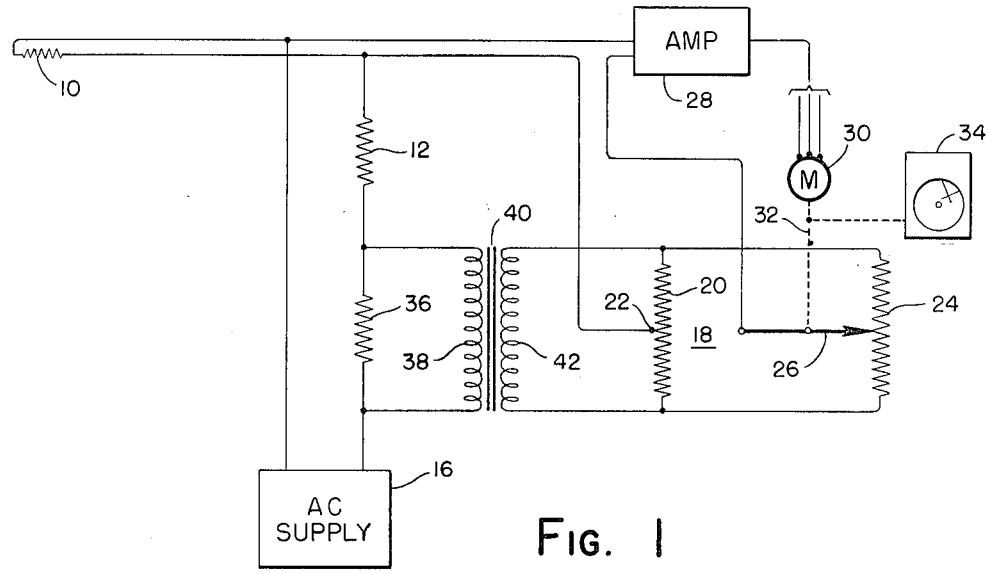

Aug. 10, 1965     A. J. HORNFECK     3,199,354
COMPENSATED MEASURING CIRCUIT
Filed July 24, 1961

INVENTOR.
ANTHONY J. HORNFECK
BY
*John F. Luhrs*
ATTORNEY

United States Patent Office 3,199,354
Patented Aug. 10, 1965

3,199,354
COMPENSATED MEASURING CIRCUIT
Anthony J. Hornfeck, South Euclid, Ohio, assignor to Bailey Meter Company, a corporation of Delaware
Filed July 24, 1961, Ser. No. 126,346
15 Claims. (Cl. 73—362)

This invention relates to measuring circuits and more particularly to a temperature measuring circuit having compensation for effects caused by variations in current flow.

The most common temperature measuring circuits utilize a temperature responsive resistance as a temperature sensing element. Resistance bridges and potentiometer circuits are employed which in effect measure the resistance of the temperature responsive element to produce a manifestation of the temperature. In one common circuit the potential across the temperature responsive resistance is compared with a reference potential and a means responsive to the potential difference is utilized to adjust the reference potential to equalize the two potentials, the position of the adjustment means being indicative of the magnitude of the temperature measured.

A circuit of the above type affords reasonable accuracy when the temperature condition measured has a narrow range of variation at a constant set point level. It has been found, however, that substantial measurement errors result when the circuit is utilized to measure a condition which varies in level and/or has a wide range of variation.

The error introduced by changes in temperature level is caused by variations in current flow through the temperature responsive resistance with changes in the resistance value thereof. If a constant voltage source is utilized the current flow through the resistance element will vary with the resistance thereof during variations in temperature, and a change in potential across the resistance element will be related to both the resistance and current change. Thus, a change in potential with temperature is partly affected by current to introduce an error in the measurement.

In the case of a temperature difference measurement the error is even more troublesome. In this case two temperature responsive resistance elements are usually connected in a bridge or equivalent circuit arrangement, and the bridge output or potential difference of the two elements is compared with a reference potential. In this case an increase in temperature level (average temperature) with a constant temperature difference results in a marked decrease in the potential difference as a result of the decrease in current flow through each element with increase in resistance thereof.

Attempts have been made to compensate measuring circuits for errors introduced by variations in current flow. However, methods which have not been prohibited by cost considerations have heretofore been unsatisfactory, and for the most part the measuring circuits are limited in use to temperature conditions which vary only in a narrow range.

It is a principal object of the invention to compensate a measuring circuit for errors caused by variations in current flow through a variable condition responsive impedance.

Another object of the invention is to provide a temperature measuring circuit capable of accurately manifesting a temperature condition even during wide variations in the magnitude of the temperature condition.

Another object of the invention is to compensate the reference potential of a temperature measuring circuit for variations in current flow through a temperature responsive resistance.

Still another object of the invention is to provide a measuring circuit for measuring a temperature difference which is compensated for errors introduced by variations in temperature level.

In one embodiment of the invention a temperature sensitive resistance element is connected across an alternating voltage source in series with a relatively low fixed compensating resistance which is in turn connected in parallel with the primary winding of a transformer. The secondary winding of the transformer is utilized to energize a potentiometer or reference circuit including a slidewire resistance having a movable contact arm of variable reference potential depending on the position thereof. The reference potential of the contact arm is compared with the potential drop across the temperature responsive resistance element and the contact arm is positioned to balance the two potentials to cause the position of the contact arm to be indicative of the temperature. The fixed compensating resistance connected across the transformer primary winding is effective to establish a voltage across the primary winding and the slidewire resistance proportional to the current flow through the temperature responsive resistance element. In this manner the reference potential of the contact arm is compensated for variations in current flow through the temperature responsive resistance element to render the measurement substantially unaffected by variations in current flow caused by variations in temperature or resulting from other conditions.

Figure 2:
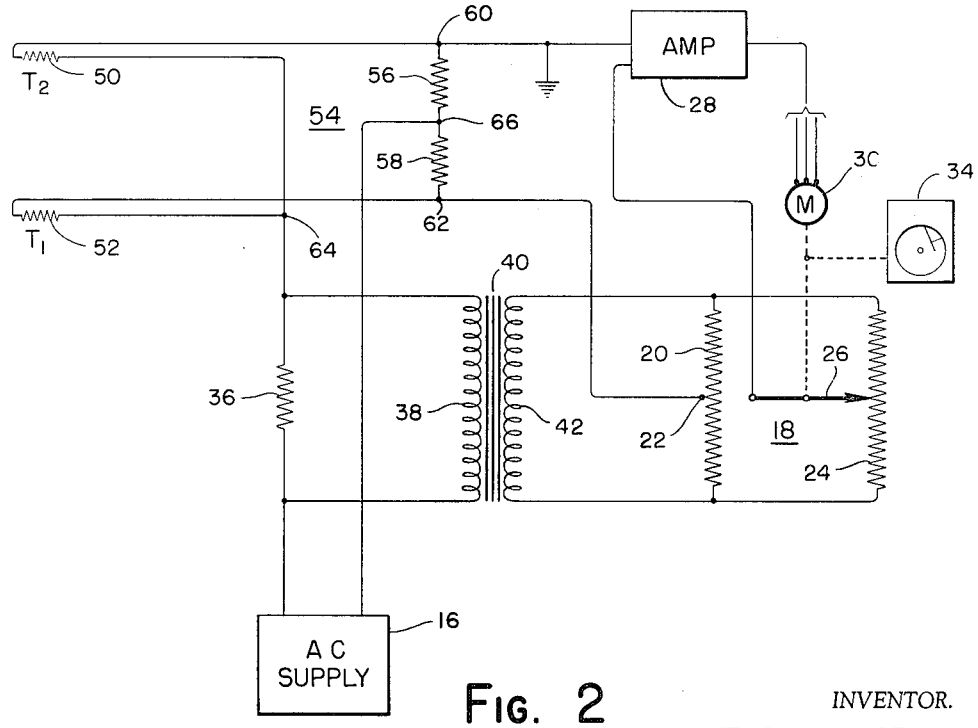

Other objects and advantages will become apparent from the following description taken in connection with the accompanying drawings wherein:

FIG. 1 is a schematic illustration of a measuring circuit embodying this invention; and
FIG. 2 is a schematic illustration of a measuring circuit forming another embodiment of the invention.

Referring now to FIG. 1 on the drawings, there is shown a temperature measuring circuit which includes a temperature responsive resistance element 10 formed from material which will undergo a variation in resistance with a variation in temperature. The element 10 is connected in series with a current limiting resistance 12 across an alternating voltage source 16.

The potential across the temperature responsive resistance element 10 is compared with a reference potential in a potentiometer or reference circuit 18 which includes a resistance 20 having a center tap 22 and a slidewire resistance 24 having a movable contact arm 26 the potential of which is the reference potential for the system. The center tap of resistance 20 is connected to the junction of resistances 10 and 12 while an amplifier 28 is electrically connected to one end of resistance element 10 and contact arm 26 to form a comparison circuit wherein the potential drop across element 10 is compared with the reference potential of the control arm 26. The amplifier 28 is responsive to the potential difference and is utilized to control rotation of a motor 30 which positions contact arm 26 through linkage 32 to balance the two potentials, the resultant position of contact arm 26 being indicative of the temperature of element 10. A recording instrument 34 is also arranged to be actuated by motor 30 through linkage 32 to provide a continuous record of the temperature.

With the circuit thus far described, if a constant voltage is applied to the potentiometer circuit 18 the potential drop across slidewire resistance 24 will be constant and the potential at any point over the length of the slidewire will be constant. If the current flow through resistance element 10 were also constant, rendering the potential drop across resistance element 10 only dependent on the resistance value thereof, this hypothetical system would provide optimum measurement accuracy at any magnitude of the measured temperature except as limited by the characteristics of resistance element 10. However, when a change in resistance value of resistance element 10 occurs a change in current flow will also occur which affects the potential drop and introduces an error into the circuit. This error is minimized to some extent by the provision of current limiting resistance 12 which provides a large constant circuit resistance. However, an objectionable error still occurs which would limit application of the measuring system.

I have found that the error introduced by a change in current flow can be substantially eliminated by establishing an energizing voltage for potentiometer circuit 18 having a magnitude proportional to the current flow through resistance element 10 to thereby vary the potential across slidewire resistance 24 and the reference potential of contact arm 26 to compensate for variations in potential drop across the resistance element 10 caused by variations in current flow.

To achieve the aforementioned result a resistance 36 of relatively low fixed resistance value is connected in series with the current limiting resistance 12 and resistance element 10 to thereby produce a potential drop dependent on the magnitude of the current flow through the circuit of resistance element 10. The primary winding 38 of a transformer 40 is connected across resistance 36 while the secondary winding 42 is coupled to the potentiometer circuit 18 to energize the same. With this arrangement, the resistance 36 establishes an energizing voltage for potentiometer circuit 18 proportional to the current flow through resistance element 10 to achieve the desired compensation. At the same time the inductive coupling established by transformer 38 produces the desired electrical isolation of the two circuits.

In operation of the embodiment disclosed in FIG. 1 assume an increase in the temperature of element 10 occurs causing an increase in the electrical resistance thereof. This increase in resistance results in a reduction of current flow in the circuit in which element 10 is included in accordance with Ohm's Law. The increase in resistance of element 10 increases the potential drop across element 10 but the increase is partly offset by a decrease in potential drop caused by the reduction in current flow resulting in the increased potential drop across element 10 being slightly less than would occur if the current flow were constant. However, the decreased current flow which affects the potential drop across resistance element 10 results in a decreased potential drop across resistance 36. As a result the potential across slidewire resistance 24 will decrease causing a decrease in the reference potential of contact arm 26 with which the potential drop across element 10 is compared. By adjusting the relative sizes of the various circuit elements a condition of circuit operation can be achieved where the compensating reduction in potential of the reference potential of contact arm 26 is substantially equal to the reducing effect of the reduction in current flow on the potential drop across resistance element 10 to render the comparison substantially unaffected by current variations. The circuit operates in a similar manner during a decrease in temperature to increase the reference potential of contact arm 26 to compensate for the increasing effect of the increased current flow on the potential drop across resistance element 10.

Referring now to FIG. 2 of the drawings, I have shown the application of the invention to a temperature difference measuring circuit. For purposes of simplicity parts similar to those of FIG. 1 have been given like reference numerals. In this embodiment, a pair of temperature responsive resistance elements 50 and 52 from two resistance arms of a normally unbalanced resistance bridge circuit 54 having a pair of resistances 56 and 58 of equal fixed resistance value forming the other two arms thereof. The temperature responsive resistance elements 50 and 52 may be positioned to be subjected to different temperatures, the difference of which is desired to be manifested. The normally unbalanced bridge circuit 54 is operative to establish a voltage across terminals 60 and 62 proportional to the temperature difference.

Bridge input terminals 64 and 66 are connected in series with the resistance 36 across the source 16 similar to the resistance element 10 of FIG. 1. The separate current limiting resistance of FIG. 1 being omitted in this case because of the constant circuit resistance produced by bridge resistance arms 56 and 58.

Similar to the embodiment of FIG. 1 the potentiometer or reference circuit 18 is coupled to the secondary winding 42 of transformer 40, and the primary winding 38 is connected across resistance 36 to produce a potential across slidewire resistance 24 related to the current flow in the measuring circuit. In this embodiment amplifier 28 has one input connected to bridge output terminal 60 and the other input connected to contact arm 26. To complete the circuit terminal 62 is connected to the center tap 22.

In the embodiment of FIG. 2 the bridge unbalance output potential appearing across terminals 60 and 62 is compared with the reference potential of contact arm 26. The amplifier 28 is responsive to the potential difference to produce an amplified output voltage which drives motor 30 to position contact arm 26 and balance the two potentials.

With the circuit of FIG. 2 the error caused by variations in current flow are more serious in effect than with the circuit of FIG. 1. In the circuit of FIG. 2 even though the temperature difference being measured remains constant at a predetermined set point or reference value, variation in the individual temperatures introduce a measurement error not readily apparent to an observer of recording instrument 34 which manifests only the temperature difference and provides no indication of the individual temperatures or average temperature. For example, if the temperatures of elements 50 and 52 increase by an equal amount causing an increase in the average temperature, the temperature differential will remain constant. However, as a result of the increase in temperature of elements 50 and 52 the potential drop across the same will be subject to the error introduced by the change in current flow through each element as described in connection with element 10 of FIG. 1.

In the circuitry disclosed wherein resistances 56 and 58 have equal resistance values the bridge 54 output at terminals 60 and 62 is equal to the voltage difference of the potential drops across elements 50 and 52 as will be readily apparent to those skilled in the art. If the current flow through elements 50 and 52 were constant irrespective of resistance change, the potential at terminals 60 and 62 would have a linear relationship with the temperature difference of elements 50 and 52 regardless of the average temperature or temperature level except as affected by the resistance temperature characteristic of elements 50 and 52. However, similar to the circuit of FIG. 1 as the resistance of each of the elements 50 and 52 changes with temperature there is an accompanying variation in the current flow through each element which results in a potential drop affected accordingly. Similar to FIG. 1, as the resistance of each element 50 and 52 increases the current decreases and the potential drop is less than in the case of a constant current condition. In the case of an increasing average temperature of elements 50 and 52 at a constant temperature difference condition the net effect is a reduction in the output potential at terminals 60 and 62 to falsely manifest a decreasing temperature differential. Similarly, during a decreasing average temperature at a constant temperature difference condition the bridge output will increase.

In the circuit of FIG. 2 the resistance 36 functions to produce a variation in the reference potential of contact arm 26 substantially equal to the variation in bridge output caused by current variations to thereby compensate the system for the error described above and to cause the position of contact arm 26 to have a substantially linear relationship with the temperature difference condition being measured.

It is to be noted that each of the resistance elements 50 and 52 are connected in separate legs of the bridge circuit 54 and are in effect connected in a separate parallel circuit which is connected in series with the resistance 36 across the source. With this arrangement the potential drop across one element is not affected by a resistance change of the other. However, a resistance change of either element produces a variation in current flow in its branch of the parallel circuit and additionally in the series circuit containing resistance 36. As a result the resistance 36 is operative to modify the reference potential of contact arm 26 as hereinbefore described in response to a resistance change of either or both resistance elements to compensate the reference potential for the error in bridge output caused by the change in current flow through either or both resistance elements. By properly sizing the circuit components satisfactory compensation can be achieved over a wide average temperature range and over a wide temperature difference range.

The advantages of the invention will now be apparent. The compensation means comprising resistance 36 and transformer 40 afford a simple low cost method for achieving current compensation without affecting the normal operation of the circuitry. In the usual measuring circuit a simple commercially available copper wound transformer may be employed. By utilizing a resistance 36 having a low resistance value relative to the reactance of the transformer primary winding, the reactive current component required to magnetize the transformer core becomes negligible, and the potential drop across the temperature responsive resistance circuit is substantially in phase with the potential of contact arm 26. Good results have been achieved with a resistance 36 having a resistance value equal to approximately 2% of the primary winding reactance.

It will be apparent that while the invention has been described in connection with compensation for errors resulting from variations in current with temperature, compensation will be achieved for variations in current flow caused by other conditions such as variation in leadwire resistance, etc.

While the invention has been disclosed and described in connection with the measurement of one or more temperature conditions with a temperature responsive resistance circuit, it will be appreciated that the invention is not limited in scope to this particular application but may be utilized in combination with other measuring circuits wherein a potential drop across a variable impedance is compared with a reference potential and that impedances other than resistances may be utilized throughout the circuitry depending on the particular phase relationship of the voltages desired. Thus, it will be apparent that many changes may be made in the construction and arrangement of parts without departing from the scope of the invention as defined in the appended claims.

It is claimed and desired to secure by Letters Patent of the United States:

1. In a condition responsive circuit having a source of alternating voltage, the combination comprising, a measuring impedance having a circuit impedance value proportional to the magnitude of a variable condition, a measuring circuit for said impedance connected to the source to establish a current flow through said impedance and a potential drop across the same related to the magnitude of the current and the impedance value of said measuring impedance, a second impedance connected in series with said measuring impedance for producing a potential drop in said measuring circuit proportional to the current flow through said measuring impedance, a reference circuit including a transformer connected across said second impedance effective to establish a reference potential proportional to the potential drop across said second impedance and the current flow through said measuring impedance, said second impedance also being effective to reduce the phase displacement between the potential drop of said measuring circuit and said reference potential, and a comparison circuit for comparing the potential across said measuring impedance with said reference potential to determine the value of said measuring impedance, said second impedance being operative to compensate said reference potential for variations in current flow through said measuring impedance affecting the potential drop across said measuring impedance.

2. In a condition responsive circuit having an alternating voltage source, the combination comprising, a resistance having a resistance value proportional to the magnitude of a variable condition, a measuring circuit for said resistance connected to the source to establish a potential drop across said resistance proportional to the current flow in said circuit and the resistance value of said resistance element, a second resistance connected in said measuring circuit and having a potential drop proportional to the current flow through said condition responsive resistance, a comparison circuit including a transformer connected across said second resistance for comparing the potential drop of said condition responsive resistance with a reference potential, said second resistance being effective to reduce the phase displacement between the potential drop of said condition responsive resistance and said reference potential, and means responsive to the voltage drop across second resistance for establishing said reference potential.

3. In a condition responsive circuit having an alternating voltage source, the combination comprising, a temperature responsive resistance having a resistance value proportional to the magnitude of a variable temperature condition, a measuring circuit for said resistance connected to the source to establish a potential drop across said resistance related to the current flow in said circuit and the resistance value of said temperature responsive resistance element, a second resistance connected in said measuring circuit and having a potential drop proportional to the current flow to said temperature responsive resistance element, a comparison circuit including a transformer connected across said second resistance for comparing the potential drop of the temperature responsive resistance with a reference potential to establish a potential difference signal, said second resistance being effective to reduce the phase displacement between the potential drop of said temperature responsive resistance element and said reference potential, means responsive to said potential difference signal for manifesting the magnitude of a variable temperature condition, and means responsive to the voltage drop across said second resistance for establishing said reference potential.

4. In a condition responsive circuit as claimed in claim 3 wherein said second resistance is connected in series with said temperature responsive resistance element across the voltage source.

5. In a condition responsive circuit as claimed in claim 4 wherein said comparison circuit includes a slidewire resistance having a movable contact arm the potential of which is said reference potential, and said voltage difference responsive means is operative to position said contact arm to equalize said reference potential with the potential drop across said temperature responsive resistance element, the position of said contact arm being representative of the magnitude of the temperature condition.

6. In a condition responsive circuit having an alternating voltage source, the combination comprising, a condition responsive impedance element having an impedance value proportional to the magnitude of a variable condition, a measuring circuit for said impedance connected to the source to establish a potential drop across said impedance related to both the impedance value of said impedance and the current flow through the same, a resistance connected in said measuring circuit and having a potential drop proportional to the current flow through said condition responsive impedance, a transformer having a primary winding connected across said resistance and a secondary winding, a reference circuit coupled to said secondary winding and including a reference impedance having a reference potential drop across the same proportional to the potential drop across said resistance, said resistance in addition to having a potential drop proportional to the current flow through said condition responsive impedance also corrects the phase displacement between the reference potential and the potential drop across said condition responsive impedance, a comparison circuit for comparing the potential drop across said condition responsive impedance with the potential drop across at least a portion of said reference impedance, and means responsive to the potential difference sensed by the last said means for manifesting the magnitude of the variable condition.

7. In a condition responsive circuit as claimed in claim 6 wherein said resistance is connected in series with said measuring impedance across the alternating voltage source and a current limiting resistance is provided in said series circuit to reduce the variations in current flow in said measuring circuit with variations in impedance of said measuring impedance.

8. In a condition responsive circuit having an alternating voltage source, the combination comprising, a temperature responsive resistance having a resistance value proportional to the magnitude of a variable temperature condition, a current limiting resistance, a measuring circuit connecting said temperature responsive resistance and said current limiting resistance in series across the alternating voltage source to establish a potential drop across said temperature responsive resistance related to the current flow in said series circuit and the resistance value of said temperature responsive resistance element, a third resistance connected in said measuring circuit and having a potential drop proportional to the current flow through said temperature responsive resistance, a transformer having a primary winding connected across said third resistance and a secondary winding, a reference circuit coupled to said secondary winding and including a fourth resistance having a reference potential drop across the same proportional to the potential drop across said third resistance, said third resistance also correcting the phase displacement between the potential drop across said temperature responsive resistance and said reference potential, a comparison circuit for comparing the potential drop across said temperature responsive resistance with the potential drop across at least a portion of said reference resistance, and means responsive to a potential difference sensed by said comparison circuit for manifesting the magnitude of the temperature condition.

9. In a condition responsive circuit as claimed in claim 8 wherein said fourth resistance comprises a slidewire resistance having a movable contact arm the potential of which is said reference potential, said reference circuit including a fifth resistance connected in parallel with said fourth resistance across said secondary winding and having a center tap, said comparison circuit connecting one side of said temperature responsive resistance to said center tap, said potential difference responsive means comprising an amplifier having input connections to the other side of said side of said temperature responsive resistance and said contact arm and an electric motor responsive to the output of said amplifier to position said contact arm to equalize potential of said contact arm with the potential across said temperature responsive resistance element.

10. A circuit having a source of alternating voltage for measuring the difference in magnitude of two conditions comprising, a measuring circuit having an input and output including a pair of variable impedance elements having impedance values proportional to the magnitudes of two variable conditions respectively, the output potential of said circuit being related to the difference in impedance value of said impedances and the current flow in said circuit, a compensating impedance connected in series with said measuring circuit input across the voltage source, said compensating impedance having a voltage drop proportional to the current flow through said measuring circuit, a transformer having a primary winding connected across said compensating impedance and a secondary winding, a reference circuit coupled to said secondary winding to establish a reference potential proportional to the voltage drop across said compensating impedance, said compensating impedance correcting the phase displacement between the output potential of said measuring circuit and said reference potential and a comparison circuit for comparing the output potential of said measuring circuit with said reference potential and for manifesting the difference in magnitude of the two conditions.

11. In a measuring circuit as claimed in claim 10 wherein said compensating impedance comprises an electrical resistance and said condition responsive impedances comprise temperature responsive resistances responsive to different temperature conditions.

12. In a measuring circuit as claimed in claim 11 wherein said transformer has a primary to secondary turns ratio of one to one.

13. In a measuring circuit as claimed in claim 12 wherein said measuring circuit comprises a bridge circuit having said temperature responsive resistance elements forming two arms thereof and a pair of resistances of fixed resistance value forming the other two arms thereof.

14. A measuring circuit having a source of alternating voltage for measuring the difference in magnitude of two temperature conditions, comprising, a bridge circuit having an input and output including a pair of temperature responsive resistances connected as two arms of said bridge circuit and each operative to undergo a variation in electrical resistance in response to a variation in its temperature condition, the voltage output of said bridge circuit being related to the difference in resistance values of said temperature responsive resistances and the current flow in said bridge circuit, a compensating resistance connected in series with said bridge circuit input across the voltage source, said compensating resistance having a voltage drop proportional to the current flow in said bridge circuit, a transformer having a primary winding connected across said compensating resistance and having a secondary winding, a reference circuit coupled to said secondary winding for establishing a reference potential proportional to the voltage drop across said compensating resistance, said compensating resistance also correcting the phase displacement between the voltage output of said bridge and said reference potential, a comparison circuit for comparing said bridge output with said reference potential to establish a difference potential, and means responsive to said difference potential for manifesting the temperature difference condition.

15. In a measuring circuit as claimed in claim 14 wherein said reference circuit comprises a center tapped resistance connected in parallel combination with and a slidewire resistance having a movable contact arm, said parallel combination connected across said secondary winding, the reference potential being the potential of said contact arm relative to said center tap, and said difference potential responsive means comprises an electric amplifier and an electric motor coupled to said amplifier operative to position said contact arm to equalize said reference potential with said bridge output.

References Cited by the Examiner
UNITED STATES PATENTS

| | | | |
|---|---|---|---|
| Re. 22,637 | 4/45 | Keinath | 73—362 X |
| 614,628 | 12/48 | Foster | 73—362 |
| 2,362,661 | 11/44 | Peters et al. | 340—187 X |
| 2,659,234 | 11/53 | Harrison | 73—362 |
| 2,698,406 | 12/54 | Arrott | 73—362 X |

OTHER REFERENCES

Review of Scientific Instruments, vol. 25, No. 9, 1954, pp. 878–883 relied upon.

ISAAC LISANN, *Primary Examiner.*